United States Patent
Kocher et al.

(10) Patent No.: US 10,621,419 B2
(45) Date of Patent: Apr. 14, 2020

(54) METHOD AND SYSTEM FOR INCREASING BIOMETRIC ACCEPTANCE RATES AND REDUCING FALSE ACCEPT RATES AND FALSE RATES

(71) Applicants: Robert William Kocher, McLean, VA (US); Richard Peter Syretz, Jr., Manassas, VA (US)

(72) Inventors: Robert William Kocher, McLean, VA (US); Richard Peter Syretz, Jr., Manassas, VA (US)

( * ) Notice: Subject to any disclaimer, the term of this patent is extended or adjusted under 35 U.S.C. 154(b) by 0 days.

(21) Appl. No.: 15/530,121

(22) Filed: Dec. 6, 2016

(65) Prior Publication Data
US 2018/0157896 A1 Jun. 7, 2018

(51) Int. Cl.
*G06K 9/00* (2006.01)
*G06K 9/62* (2006.01)

(52) U.S. Cl.
CPC ..... *G06K 9/00288* (2013.01); *G06K 9/00221* (2013.01); *G06K 9/00255* (2013.01); *G06K 9/00758* (2013.01); *G06K 9/00885* (2013.01); *G06K 9/00926* (2013.01); *G06K 9/6255* (2013.01)

(58) Field of Classification Search
CPC ........... G06K 9/00288; G06K 9/00221; G06K 9/00261; G06K 9/00335; G06K 9/00758; G06K 9/00926
USPC .................................................. 382/115, 118
See application file for complete search history.

(56) References Cited

U.S. PATENT DOCUMENTS

| | | | | |
|---|---|---|---|---|
| 7,330,570 B2* | 2/2008 | Sogo | ................... | G06K 9/00288 340/5.52 |
| 7,421,097 B2* | 9/2008 | Hamza | ............... | G06K 9/00288 235/382 |
| 7,876,931 B2* | 1/2011 | Geng | ................. | G06K 9/00288 345/419 |
| 7,925,887 B2* | 4/2011 | Burton | .................... | G06F 21/32 713/186 |
| 8,036,431 B1* | 10/2011 | Fisher | ................ | G06K 9/00013 382/115 |
| 8,144,945 B2* | 3/2012 | Wang | ................. | G06K 9/00248 340/5.83 |

(Continued)

FOREIGN PATENT DOCUMENTS

JP 2007287080 A * 11/2007

*Primary Examiner* — John Villecco

(57) ABSTRACT

A method and system for increasing biometric acceptance rates is provided. The invention creates numerous enrollment reference images so that when an individual presents them self to a biometric sensor, the individual's live image is compared to numerous enrollment reference images which establish a very high matching threshold score and at least one reference image which exceeds the matching threshold for an individual. Since the acceptance threshold is set very high, around 0.98 the chances that a false accept occurs is significantly reduced. By selecting numerous different reference photographs of the enrolled candidate, there's a greater possibility of a very high score match to the live scan. As you increase the number of biometric enrollment reference photos, you increase the probability of the live scan achieving a very high match against the enrollment reference photos. The enrollment reference photos may be visualized as a shotgun distribution on a graph.

3 Claims, 8 Drawing Sheets

(56) References Cited

U.S. PATENT DOCUMENTS

| | | | | |
|---|---|---|---|---|
| 8,150,109 B2* | 4/2012 | Sung | G06K 9/00288 | 382/118 |
| 8,254,645 B2* | 8/2012 | Okubo | G06K 9/6228 | 382/106 |
| 8,363,952 B2* | 1/2013 | Bigioi | G06K 9/00221 | 382/190 |
| 8,401,254 B2* | 3/2013 | Yoshio | G06F 17/30256 | 382/118 |
| 8,848,985 B2* | 9/2014 | Inoue | G06F 17/30247 | 382/118 |
| 8,879,805 B2* | 11/2014 | Wang | G06K 9/6255 | 382/118 |
| 8,903,123 B2* | 12/2014 | Tsurumi | G06K 9/00295 | 348/169 |
| 8,948,465 B2* | 2/2015 | Tiwari | G06K 9/00771 | 382/115 |
| 9,025,882 B2* | 5/2015 | Okubo | G06K 9/6298 | 382/118 |
| 9,092,660 B2* | 7/2015 | Yamada | G06K 9/00268 | |
| 9,489,566 B2* | 11/2016 | Yano | G06K 9/00288 | |
| 2003/0161507 A1* | 8/2003 | Lawandy | G06K 9/00255 | 382/118 |
| 2004/0133582 A1* | 7/2004 | Howard | G06K 9/00006 | |
| 2005/0008199 A1* | 1/2005 | Dong | G06K 9/00288 | 382/115 |
| 2006/0140486 A1* | 6/2006 | Kondo | G06K 9/00248 | 382/224 |
| 2007/0172126 A1* | 7/2007 | Kitamura | G06K 9/00228 | 382/190 |
| 2008/0080743 A1* | 4/2008 | Schneiderman | G06F 17/30793 | 382/118 |
| 2011/0206244 A1* | 8/2011 | Munoz-Bustamante | G06K 9/00288 | 382/118 |
| 2012/0070041 A1* | 3/2012 | Wang | G06F 21/32 | 382/118 |
| 2013/0051632 A1* | 2/2013 | Tsai | G06K 9/00892 | 382/118 |
| 2013/0266193 A1* | 10/2013 | Tiwari | G06K 9/00771 | 382/115 |
| 2014/0079299 A1* | 3/2014 | Sukegawa | G06K 9/00288 | 382/118 |
| 2014/0140583 A1* | 5/2014 | Yano | G06K 9/00288 | 382/118 |
| 2014/0226877 A1* | 8/2014 | Je | G06K 9/00288 | 382/118 |
| 2015/0043790 A1* | 2/2015 | Ono | G06K 9/00288 | 382/118 |
| 2015/0363636 A1* | 12/2015 | Tate | H04N 5/247 | 382/103 |
| 2015/0363642 A1* | 12/2015 | Irie | G06K 9/6263 | 382/103 |
| 2016/0063235 A1* | 3/2016 | Tussy | G06F 21/32 | 726/6 |
| 2016/0217319 A1* | 7/2016 | Bhanu | G06K 9/00288 | |
| 2017/0017834 A1* | 1/2017 | Sabitov | G06K 9/00288 | |
| 2017/0039419 A1* | 2/2017 | Shiiyama | G06T 7/003 | |
| 2017/0075993 A1* | 3/2017 | Matsushita | G06F 17/30793 | |
| 2017/0243054 A1* | 8/2017 | Lee | G06K 9/00288 | |
| 2019/0042835 A1* | 2/2019 | Mostafa | G06K 9/00288 | |

* cited by examiner

METHOD AND SYSTEM FOR INCREASING BIOMETRIC ACCEPTANCE RATES AND REDUCING FALSE ACCEPT RATES AND FALSE RATES

CROSS-REFERENCE TO RELATED APPLICATION

None.

BACKGROUND

Field of Invention

This invention relates to computerized biometric matching used to compare images and achieve match scores.

Description of Prior Art

A major issue with using face matching technology is that prior art has problems with a computer achieving a high probability of match rates without increasing higher false rejection rates; a current issue is that when the threshold for achieving a match is raised, the probability of falsely rejecting someone is subsequently increased. System algorithms are evaluated by developing False Accept Rates (FAR) and False Reject Rates (FRR). Current technology attempts to reduce false match results (FAR) and reduce false no-match rates (FRR). The greater you want to increase the probability that the live image collected matches file image, the greater the negative effect grows that the probability that the live image does not match the file image. This can result whereby the computer system determines no-match when in actuality the live image is supposed to be a match. This is an important feature of any biometric identify system to insure the matching system is accurate in match and no-match information. Current art approaches this problem in negative approach by reducing the matching threshold to better allow in match images but increasing the probability of creating a match when a match is not the correct person. Physical access system venders are sensitive to customer satisfaction and tend to ensure the correct person is not rejected access. It is "better to match than not match an authorized person." This problem become more serious when the system is supposed to identify "bad persons." If the matching threshold is adjusted low, this will increase the probability that a "good person" is mistaken for a bad person. This can be a serious situation in law enforcement or military operations.

SUMMARY

This invention creates numerous enrollment reference images so that when an individual presents himself to a biometric sensor, the individual's live image is compared to numerous reference images allowing to establish a very high matching threshold score and at least one reference image to surpass the matching threshold for an individual in the file. Since the acceptance threshold is set high, the chances that a false accept are significantly reduced.

In our system, by selecting numerous different photographs of the enrolled candidate, there's a greater possibility of a very high score match to the live scan. As you increase the number of biometric photos, you increase the probability of the live scan achieving a high match against one of those photos. This could be visualized as a shotgun distribution on a graph; if the live scan is the person in a reference file, that shotgun distribution will place higher compared to someone that doesn't match the biometric. All it takes is one image to cross the threshold to achieve a match. The series of biometric images comprises what can be collectively referred to as the "shotgun template." The probability of having a live scan match against a large number of photos is greater than against a small number of photos. Our method of enrollment consists of moving the biometric multi-directionally to create numerous varied biometric image templates.

The next part of our invention is to extract a sample of the video images since the video captures the motion of moving right-left or up-down, every third fourth or some other number of frames can bet taken as a sample, instead of searching every frame. Cameras normally capture 30-60 frames a second. A lesser number would be selected such as 1-10 frames/second, to build a signature file of that individual. The signature file is converted into templates that can be searched in the biometric search engine against the live scan. The live scan is image taken of the person's biometric that is converted to a template and added to the biometric matcher. To increase the probability of a match, a similar approach could be used on the live scan; instead of a single photo of someone approaching the biometric collector, multiple photos could be take or a video could be used to create a high number of images. The challenges of today's match engines are that due to template size, comparisons of multiple images against multiple images quickly reaches physical limitations for computer systems. Recent breakthroughs in template size will allow billions of comparisons in seconds, which was previously not possible. The recent developments in very small templates through machine learning results in numbers over a million being capable of being stored in a mobile device. This new capability of matching numerous templates with this invention's ability to create a high number of templates when someone is enrolling and when a live image is taken.

DESCRIPTION OF THE SEVERAL VIEWS OF THE DRAWINGS

FIG. 4 is a graphical display of electronic shotgun files.

DRAWING REFERENCE NUMERALS

Figure 1:
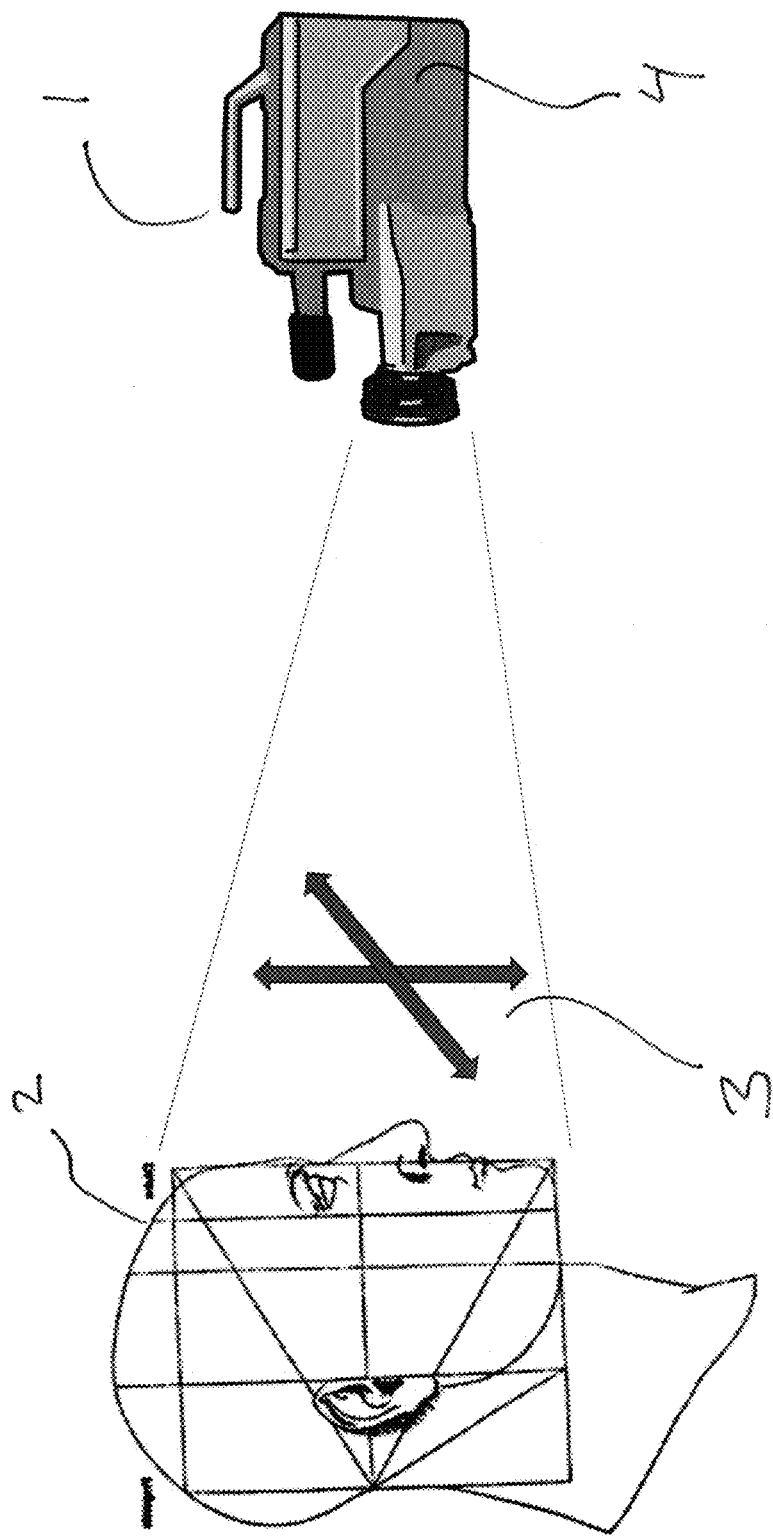
FIG. 1 depicts collecting of facial biometrics with a video capture device creating a video stream of facial photos through moving the face up, down, left, right. This creates a shotgun distribution file for face images.

1 video capture device
2 biometric to be enrolled form the person 3 multi-directional motion that creates the video stream
4 streaming video that is capture by 1 video capture device
5 selected images from the video stream
6 the converted images in a searchable digital file
7 live scan biometric
8 digital conversion of a live scan biometric
9 complete biometric database in digital searchable format
10 image of the highest match from the biometric searchable database
11 camera capture device
12 match score
13 probability-of-match axis
14 current FAR/FRR matching level
15 new FAR/FRR matching functional level that has not currently been achieved
16 hand
17 nose

DETAILED DESCRIPTION

Method and System for Increasing Biometric Acceptance Rates and Reducing False Accept Rates and False Reject Rates begins with building a database of desired people to be matched. This could be enrolling people for access into a facility or photographing bad people to be used in a watchlist. Images can be obtained with the person present or from unconstrained video images taken from other sources such as security video cameras, media, or other video collection devices.

The next step is to determine what frames should be extracted from the collected video stream. This can be done geometrically by taking every second, third, fourth or n frame or it could be done electronically by selecting degree-of-change in the biometric presented.

Figure 2:
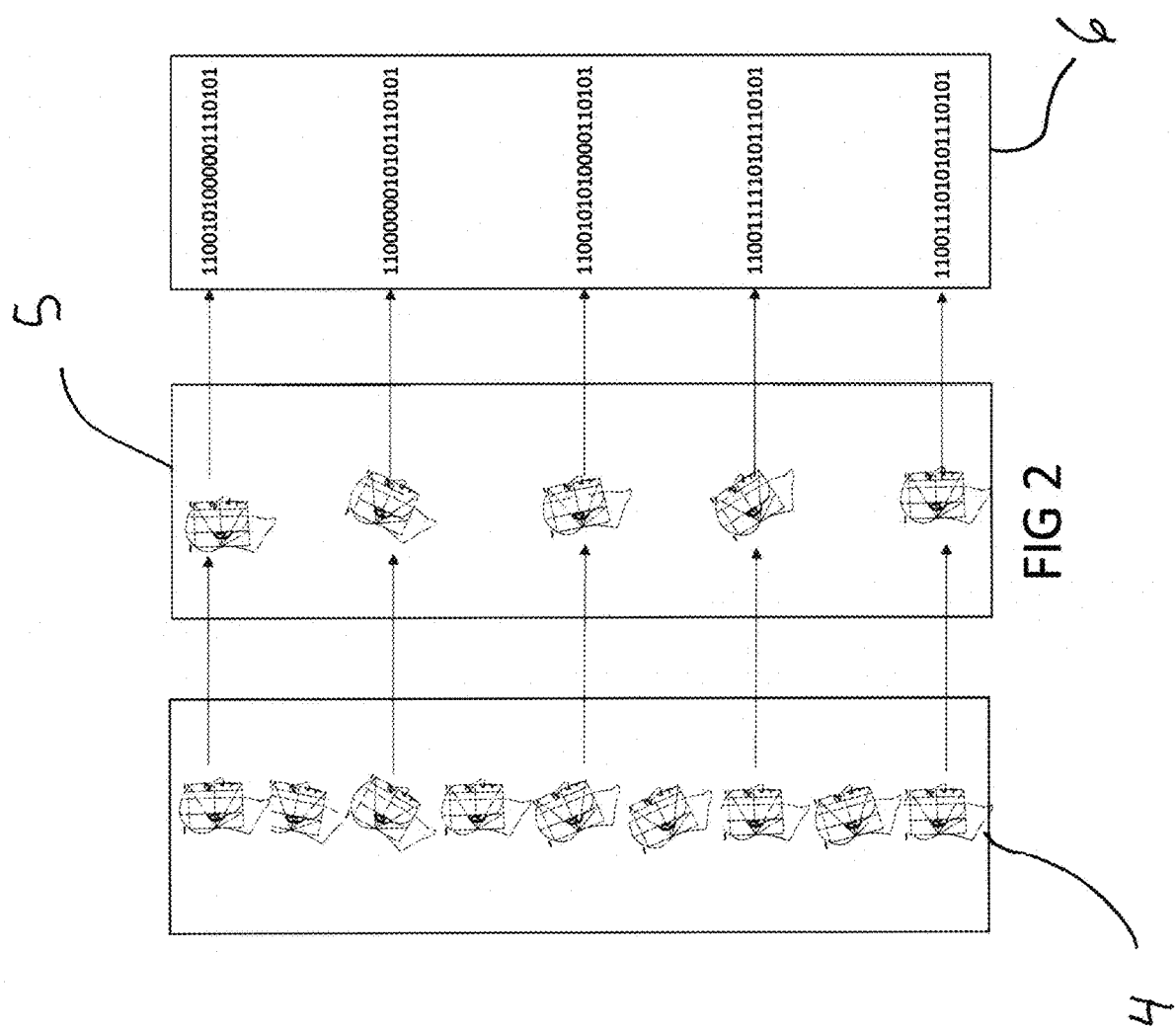
FIG. 2 takes the video stream produced in FIG. 1, extracts a shotgun file, and converts it to biometric matching templates.

FIG. 1 depicts the enrollment of a person 2 with a video capture device 1. The person motions the biometric in different directions 3 and the video stream 4 is captured in the video collection device 1. FIG. 2 depicts the video capture stream 4 used to create the image shotgun file 5. The video shotgun file 5 is then converted into electronic searchable format 6.

Figure 3:
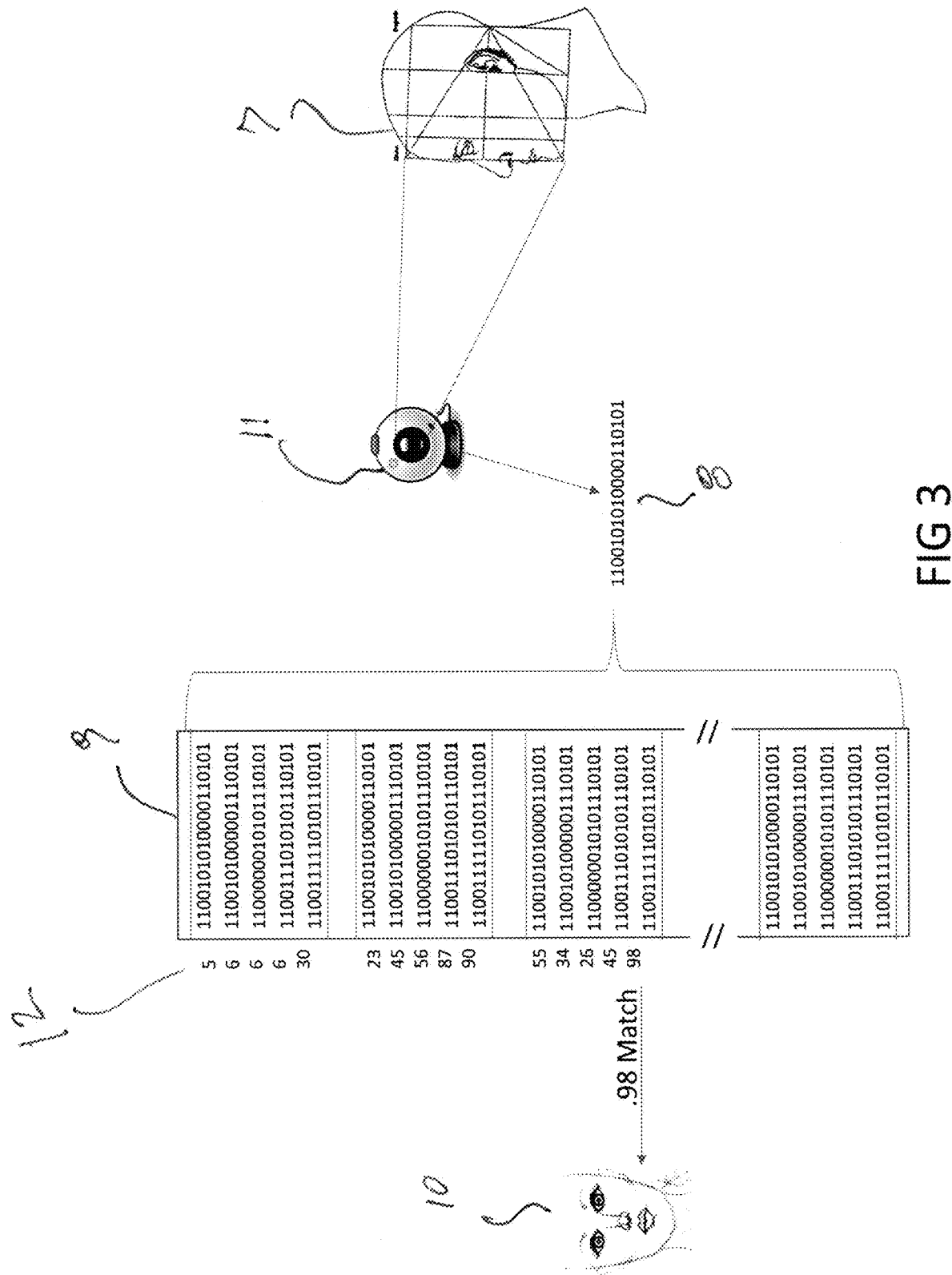
FIG. 3 depicts the capture of a live scan image by a video device to produce a live scan template and compare against the biometric database gallery and produce the highest match score.

FIG. 3 depicts the camera capture device 11 taking a photograph of the person 7 then creating the photograph into an electronic searchable image. The electronic searchable image 8 is submitted and compared against the biometric database 9 resulting in match scores 12. The highest match score 12 will result in the biometric match 10. The capture device 11 could be a video camera capturing a video stream of the person 7 and multiple live scan images 8 could be created. These multiple images could be processed into the biometric database 9 to attempt to achieve an even higher probability of a match to allow the bar to be put even higher for a match or no-match. As an example, by using video to interrogate the individual 7, 30-40 or more images 8 could be converted and matched against the database.

Figure 4:
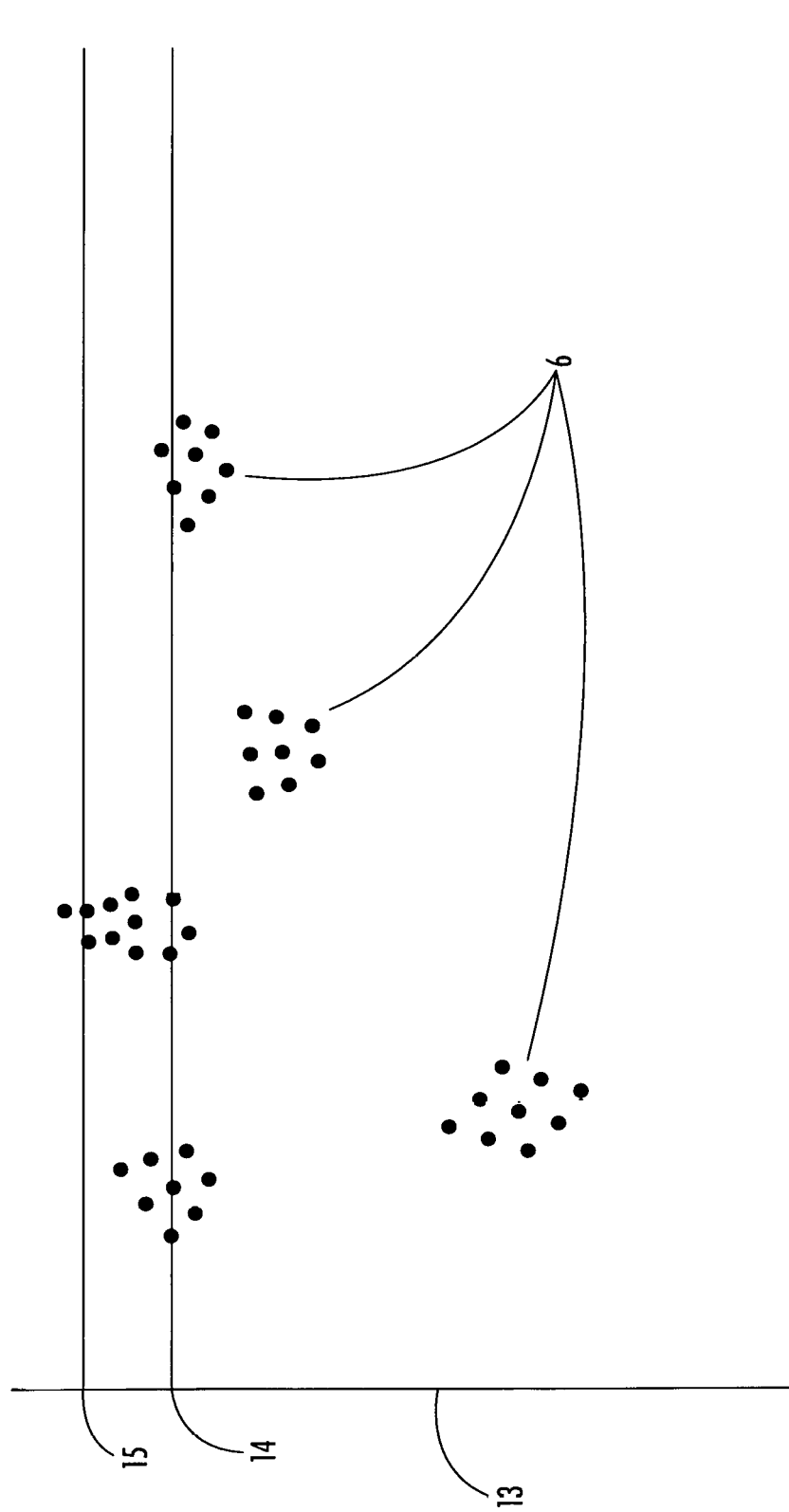
FIG. 4 depicts the distribution of shotgun image files and how this would afford a decrease in the false acceptance rate and reduce the false reject rate by raising the bar above current standards.

FIG. 4 depicts a graphical display of the electronic shotgun files 6 against the probability-of-match axis 13. The current state of the art matching levels 14 is established by the system users trading off false reject against false acceptance. This invention, through the use of numerous template images, allows the raising of the bar 14 to higher levels not previously possible 15.

FIG. 4 depicts a graphical display of the shotgun file 6 against previous levels of FAR/FRR 14 to new levels not previously achievable 15.

Figure 5:
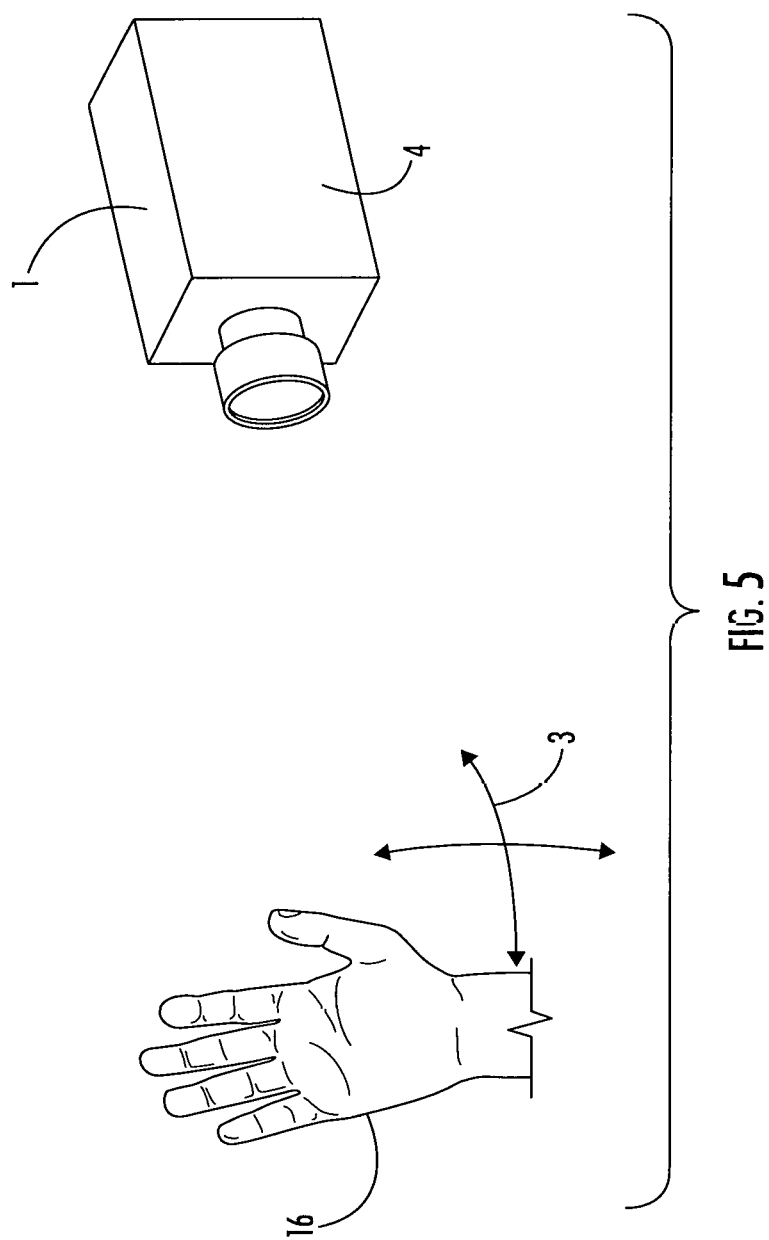
FIG. 5 is a representation of a hand going through motions which are collected by video camera.

FIG. 5 depicts a hand 16 through motion 3 and collected by video camera 1 establishing a video stream 4. Similar comparison would be done.

Figure 6:
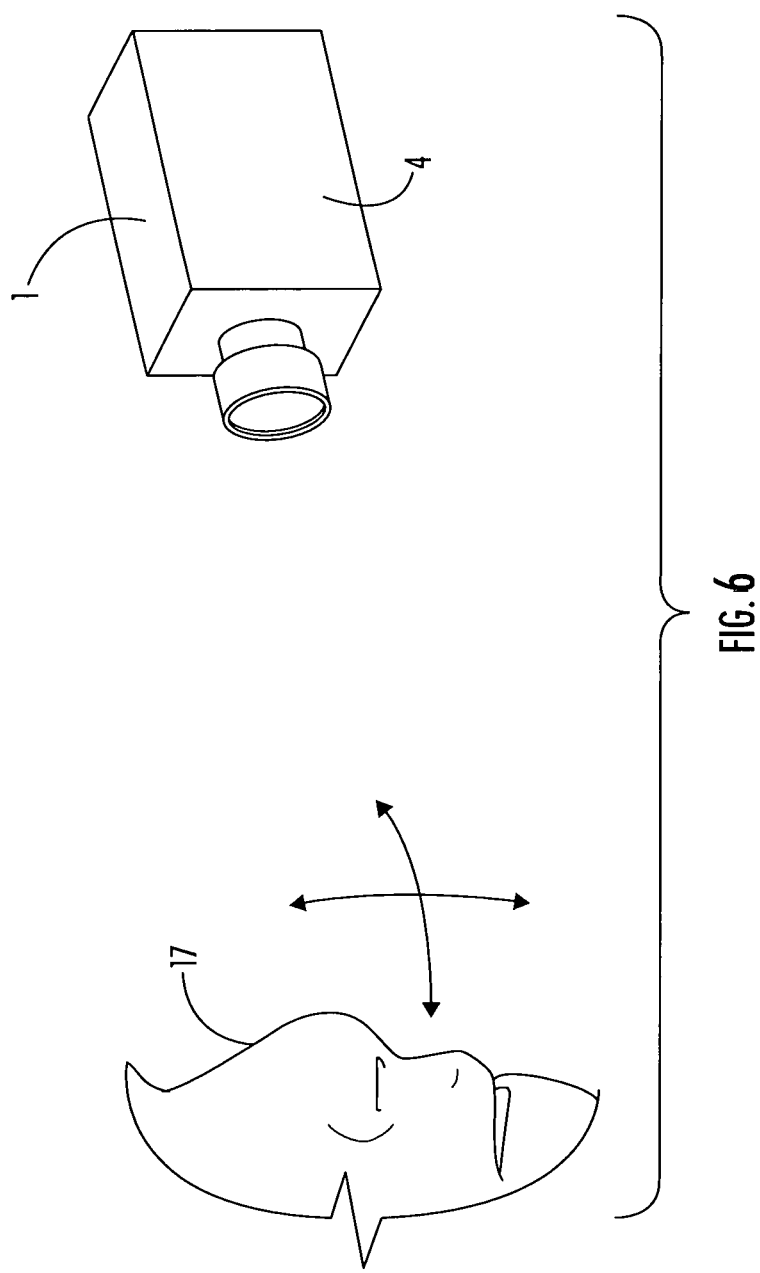
FIG. 6 is a representation of a body part, such as a nose, being collected by a video collection device.

Another alternative embodiment is FIG. 6, which depicts a body part such as a nose 17 collected by the video collection device 1 creating a video stream 4.

Figure 7:
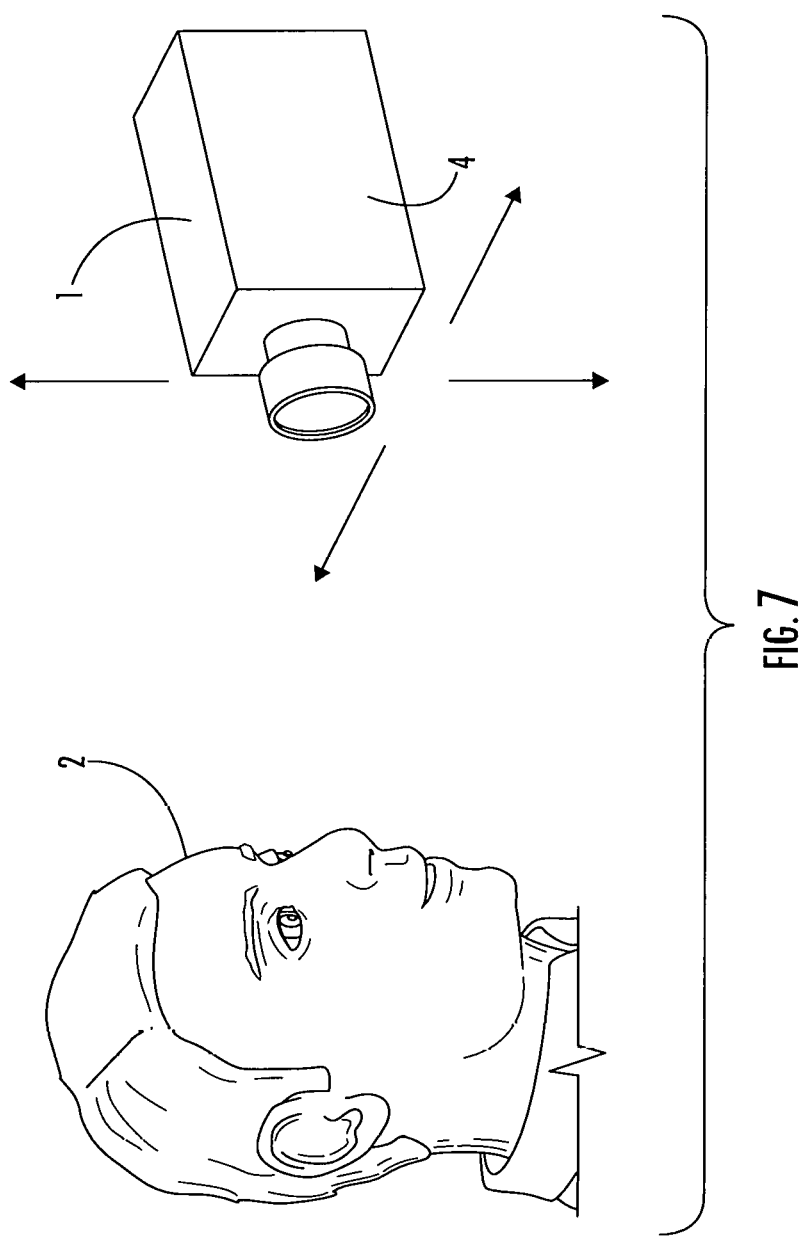
FIG. 7 is a representation of a video collection device which moves in different axes to collect a video stream of numerous biometric images.

FIG. 7 depicts the video collection device 1 to move in different axes creating video stream 4 of numerous biometric images. This embodiment would include the biometric capture device moving 360 degrees around the subject to capture all aspects of a particular biometric.

Figure 8:
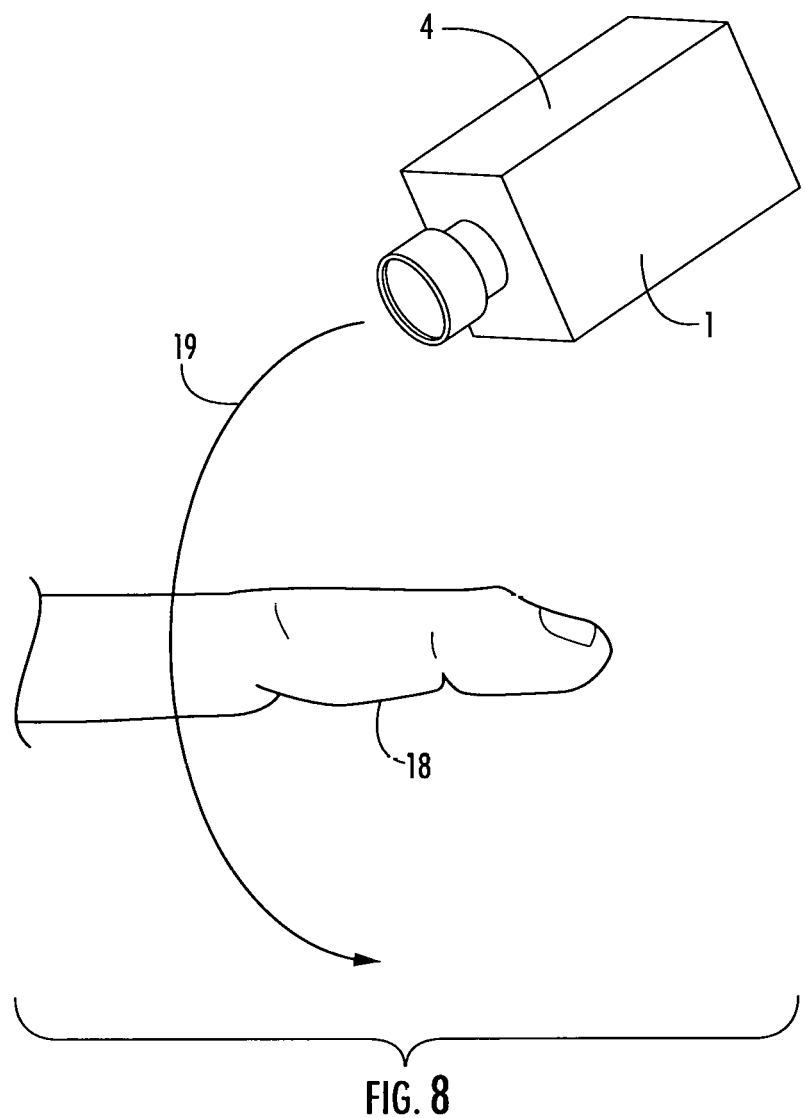
FIG. 8 depicts camera motion circling an appendage, such as finger to create a video stream of numerous biometric images.

FIG. 8 depicts the camera motion circling 19 the person or biometric appendage 18 with the video capture device 1 creating the video file 4. This would allow images of the person or appendage to match a biometric template file. This would allow a biometric image 7 to be captured with a camera 11 and searched against a biometric matching database 9. The use of non-traditional biometrics may be necessary in the future for privacy if the traditional biometrics have all been taken and/or compromised.

This invention creates numerous enrollment reference images so that when an individual presents them self to a biometric sensor, the individual's live image is compared to numerous reference images which establish a very high matching threshold score and at least one reference image which exceeds the matching threshold for an individual in the file. Since the acceptance threshold is set very high, the chances that a false accept occurs is significantly reduced. By selecting numerous different photographs of the enrolled candidate, there's a greater possibility of a very high score match to the live scan. As you increase the number of biometric photos, you increase the probability of the live scan achieving a high match against one of those reference photos. This could be visualized as a shotgun distribution on a graph. When the live scan is the person in a reference file, that shotgun distribution will place higher compared to someone that doesn't match the biometric images in the reference file. All it takes is one image to cross the very high threshold to achieve a match. The series of biometric images comprises what can be collectively referred to as the "shotgun template." The probability of having a live scan match against a large number of photos is greater than against a small number of photos. The method of enrollment consists of moving the biometric multi-directionally to create numerous varied biometric image templates. Another aspect of the invention is to extract a sample of the video images since the video captures the motion of moving right-left or up-down, every third fourth or some other number of frames can bet taken as a sample, instead of searching every frame. Cameras normally capture 30-60 frames a second. A lesser number would be selected such as 1-10 frames/second, to build a signature file of that individual. The signature file is converted into templates that can be searched in the biometric search engine against the live scan. The live scan is image taken of the person's biometric that is converted to a template and added to the biometric matcher. To increase the probability of a match, a similar approach could be used on the live scan; instead of a single photo of someone approaching the biometric collector, multiple photos could be taken or a video could be used to create a high number of images. The challenges of today's match engines are that due to template size, comparisons of multiple images against multiple images quickly reaches physical limitations for computer systems. Recent breakthroughs in template size will allow billions of comparisons in seconds, which was previously not possible. The recent developments in very small templates through machine learning results in numbers over a million being capable of being stored in a mobile device. This new capability of matching numerous templates with this invention's ability to create a high number of templates when someone is enrolling and when a live image is taken.

Alternative embodiments could include different biometrics such as face, fingerprint, iris, body components such as hands, nose, and ears.

The invention claimed is:

1. A method for reducing both false acceptance rates and false rejection rates in a biometric matching process, the method comprising:
   a. enrolling a plurality of people into an enrollment reference database of photographic images by filming a body part of each person of the plurality of people with a video camera while the body part or video camera is moving, wherein large numbers of images of the person's body part at multiple, varying angles are captured in video;
   b. extracting entire individual video frames and placing the extracted individual video frames, without segmentation into regions, into a shotgun file for each said person of the plurality of people through a specified time period or percent of face rotations and storing the shotgun file including the individual video frames into the enrollment reference photographic image database for each said person of the plurality of people
   c. using software which converts said extracted individual video frames of each said shotgun file into body part matching templates;
   d. collecting at least one live biometric body part image and converting said at least one biometric live body part image to a biometric matching template
   e. using a matching algorithm to compare said biometric matching template with the body part matching templates to generate a match score;
   f. selecting the highest match score above a very high threshold and presenting the extracted individual video frame of the highest match score that is above the very high threshold.

2. The method of claim 1, wherein the body part is selected from the group consisting of a face, fingerprint, iris, hand, nose, and ear.

3. The method of claim 1, wherein the at least one biometric body part image is several biometric body part images.

\* \* \* \* \*